United States Patent
Li

(10) Patent No.: US 7,127,519 B2
(45) Date of Patent: *Oct. 24, 2006

(54) BACK OFF METHODS AND SYSTEMS

(75) Inventor: Chih-Peng Li, Kaohsiung (TW)

(73) Assignee: Lucent Technologies Inc., Murray Hill, NJ (US)

( * ) Notice: Subject to any disclaimer, the term of this patent is extended or adjusted under 35 U.S.C. 154(b) by 691 days.

This patent is subject to a terminal disclaimer.

(21) Appl. No.: 09/848,127

(22) Filed: May 3, 2001

(65) Prior Publication Data

US 2002/0188750 A1    Dec. 12, 2002

(51) Int. Cl.
G06F 15/16    (2006.01)
G06F 11/00    (2006.01)

(52) U.S. Cl. .................. 709/230; 709/235; 370/229

(58) Field of Classification Search ........ 709/230–235; 370/229–238
See application file for complete search history.

(56) References Cited

U.S. PATENT DOCUMENTS

| | | | | |
|---|---|---|---|---|
| 5,734,833 A * | 3/1998 | Chiu et al. | .................. | 709/225 |
| 6,125,792 A * | 10/2000 | Gee | ............. | 119/770 |
| 6,215,792 B1 * | 4/2001 | Abi-Nassif | .................. | 370/458 |
| 6,275,497 B1 * | 8/2001 | Varma et al. | ............... | 370/431 |
| 6,285,662 B1 * | 9/2001 | Watanabe et al. | ........... | 370/280 |
| 6,614,799 B1 * | 9/2003 | Gummalla et al. | ......... | 370/448 |
| 6,671,284 B1 * | 12/2003 | Yonge et al. | ............... | 370/462 |
| 6,870,809 B1 * | 3/2005 | Vaidya et al. | ............... | 370/229 |
| 6,907,044 B1 * | 6/2005 | Yonge et al. | ............... | 370/445 |
| 2002/0154653 A1 * | 10/2002 | Benveniste | ................. | 370/447 |

FOREIGN PATENT DOCUMENTS

EP    0 877 511 A2    4/1998

OTHER PUBLICATIONS

Muir, Andrew and J.J. Garcia-Luna-Aceves. Group Allocation Multiple Access with Collision Detection. INFOCOM '97. Proceedings IEEE, vol. 3, Apr. 7-11, 1997 pp. 1182-1190 vol. 3.*

(Continued)

Primary Examiner—Jason Cardone
Assistant Examiner—Jeffrey R. Swearingen

(57) ABSTRACT

A Near Optimal Fairness (NOF) algorithm is disclosed for resolving data collisions in a network shared by a plurality of users. The NOF algorithm calculates an optimal back-off or contention window which is broadcast to users competing for system bandwidth. The NOF algorithm handles data contention in cycles and guarantees that each user competing for system bandwidth within a cycle will make a successful reservation before the cycle ends and a new cycle begins. The size of the back-off window is preferably equal to the number of successful reservations in the previous cycle, and functions as an estimate of the number of competing users in the current cycle.

17 Claims, 13 Drawing Sheets

OTHER PUBLICATIONS

Bononi et al. "Design and Performance Evaluation of an Asymptotically Optimal Backoff Algorithm for IEEE 802.11 Wireless LANs." Proceedings of the 33rd Hawaii International Conference on System Sciences. Jan. 4-7, 2000.*

Bianchi et al. "Performance Evaluation and Enhancement of the CSMA/CA MAC Protocol for 802.11 Wireless LANs." PIMRC'96. Seventh International Symposium on Personal, Indoor and Movile Radio Communications. Oct. 15-18, 1996. vol. 2. 392-396.*

Tay et al. "A Capacity Analysis for the IEEE 802.11 MAC Protocol." Wireless Networks. vol. 7, Issue 2. Mar. 2001. pp. 159-171.*

Cali et al. "Dynamic Tuning of the IEEE 802.11 Protocol to Achieve a Theoretical Throughput Limit." IEEE/ACM Transactions on Networking. vol. 8, No. 6. Dec. 2000. 785-799.*

* cited by examiner

BACK OFF METHODS AND SYSTEMS

FIELD OF THE INVENTION

The invention generally relates to data contention resolution in which a plurality of users are contending for access to a data network, and more particularly, to systems and methods for resolving data collisions.

BACKGROUND OF THE INVENTION

In any network in which multiple users are connected to a shared communications channel, there is typically a method to resolve which user obtains use of the channel when there is contention. When two or more users attempt to transmit data simultaneously in the same bandwidth, a collision can occur and data can be lost. The various methods to resolve contests between users and to recover from data collisions are often called Medium Access Control (MAC) protocols.

A major category of MAC protocols is the random access type. These protocols adopt package contention techniques, such as Slotted ALOHA or Carrier Sense Multiple Access (CSMA) to handle channel contention. Slotted Aloha reduces the number of data collisions by dividing the channel into time slots and requiring that users transmit at the beginning of each slot. Collisions occur in Slotted Aloha systems when two or more users transmit to the same time slot simultaneously. CSMA reduces collisions by having users monitor the data channels to determine whether the channel is busy or available for transmission. Collisions occur in CSMA when two or more users simultaneously sense a channel is free and transmit at the same time.

A separate category of MAC protocols is the demand-assignment type. These protocols manage network contention by dividing the channel into reservation slots and requiring that users reserve a channel slot to transmit. Unlike the random access protocols, users on a demand-assignment system are assured that the data will transmit without collision once a successful reservation is made. Demand-assignment collisions still occur, however, in the reservation phase of the transmission when two or more users attempt to make reservations in the same bandwidth simultaneously.

Data collisions are a fact of life when multiple users are connected to a shared communications channel, regardless of whether a random access or demand assignment protocol is used. To avoid losing data every time a collision occurs, MAC protocols use collision resolution or back-off algorithms to recover from the collision and determine when to re-transmit the data that collided.

There are three widely-known types of back-off algorithms in the art. The first is a splitting algorithm, also known as a tree algorithm. The second type is an adaptive p-persistence algorithm, and the third is a binary exponential back-off (BEB) algorithm. Each algorithm takes a different approach to determine when to re-transmit data that previously collided.

No single standard exists to determine which of the three categories of back-off algorithms is best. One standard of performance is throughput. In general, throughput is the amount of data transferred from one user to another user in a specified amount of time. In contention resolution algorithms, throughput is often measured as a ratio of the number of successful transmissions to the total number of transmission opportunities. In a wireless internet access system that uses a demand-assignment protocol, for example, throughput is the ratio of the number of successful reservations made to the total number of reservation slots available.

Of the three aforementioned classes of back-off algorithms, tree algorithms generally have the highest throughput. Although their maximum stable throughput remains unknown, tree algorithms have achieved throughputs of 0.4878. However, this higher throughput comes with a price. The tree algorithm is by far the most sophisticated of the three back-off algorithms to implement and the number of networks that can implement a tree algorithm is limited because the algorithm requires that the users have full knowledge of the three possible conditions (success, collision, idle) for every reservation slot.

The second type of back-off algorithm is an adaptive p-persistence algorithm. An adaptive p-persistence algorithm operates by calculating a retransmission probability p determined by estimating the number of active users (users who are competing for the bandwidth) using feedback from the reservation slots. The algorithm increases p when an idle slot occurs and decreases p when a collision is detected. When there are infinite number of users in the system, the maximum achievable throughput of adaptive p-persistence algorithms is at most $1/e=0.3679$. Under such circumstances, idles occur with a probability of $1/e\sim0.3679$, and collisions occur with a probability of $1-2/e\sim0.2642$.

As with a tree algorithm, an adaptive p-persistence algorithm requires feedback about the data channels that many networks do not provide. In many systems, including many computer and wireless communication networks, individual users know whether or not their own packets transmit successfully, but have no information about the status of other channels in the network. Because so many multi-user systems (including Ethernet, CATV and wireless networks) do not provide the requisite channel feedback, the BEB algorithm is often adopted for collision resolution.

Unlike tree and adaptive p-persistence algorithms, a BEB algorithm does not require that users provide feedback about every data channel. BEB operates as follows: an immediate first transmission is made as soon as a packet arrives at the head of the transmit queue. If the transmitting user detects a collision, it re-transmits k slots later, where k is a random integer number uniformly distributed over the interval [1, $2^i$]. The interval over which the uniformly distributed number is drawn is hereafter referred to as the back-off window. If i (the number of collisions) is greater than 16, the packet is lost and dropped. Once a packet is either transmitted successfully or is dropped, i is reset to zero. The logic that underlies BEB is that, for a given packet, a high number of unsuccessful transmissions implies that more users are contending for the available bandwidth and a larger Back-off window should be opened.

One of the downsides of BEB is that it suffers from a couple of performance problems. First, it causes the network to become unstable as the number of users grows very large. That is, as the number of users on a system approaches infinity the throughput of a BEB system approaches zero. In addition, BEB results in a last-come-first-serve effect among the competing users. Specifically, a user that has a packet newly arrived at the head of the transmit queue has a higher probability of acquiring a reservation slot than does a user that has already been in the queue and experienced one or more collisions. This occurs because the user whose packet just arrived in the queue will have a relatively smaller back-off window than the user that has already experienced several collisions. This is called the capture effect because it allows a single or a few winning users to dominate the available bandwidth.

Thus, an unsatisfied need exists in the industry for an improved method for resolving data collisions that overcomes deficiencies in the prior art, some of which are discussed above.

SUMMARY OF THE INVENTION

The present invention comprises systems and methods for data collision resolution utilizing a Near Optimal Fairness (NOF) algorithm. The NOF algorithm calculates an optimal back-off or contention window which is broadcast to the users competing for system bandwidth. The NOF algorithm handles data contention in cycles in which every user within a cycle is generally guaranteed a successful reservation before the cycle ends. At the start of a cycle, an access point sends a common back-off or contention window to the users. The size of the window preferably is equal to the number of successful reservations in the previous cycle and functions as an estimate of the number of competing users in the current cycle. The users attempt reservations in the available reservation slots. Some succeed and some collide. A new back-off window is calculated based upon the number of users that collided, and then the users that collided can attempt to make another reservation. The process continues until every user that competed for bandwidth at the start of the cycle has made a successful reservation. The users that requested bandwidth mid-cycle and users that successfully made reservations earlier in a cycle cannot attempt to reserve a reservation slot until the next cycle begins.

In accordance with an embodiment of the present invention, a method for resolving data collision in a network shared by a plurality of users comprises the steps of calculating a first back-off window based at least in part on an estimate of the number of users on the network, sending the first back-off window to a plurality of users of the network, calculating a second back-off window based at least in part on the number of collisions that occur within the first back-off window, and sending the second back-off window to one or more of the plurality of users of the network. The first, second and subsequent back-off windows are preferably calculated within a single cycle to which a limited number of users can compete for network resources. Thus, once all the users competing for network resources within a cycle have made reservations, that is, no collision occurred, the cycle ends and a new cycle is initiated. In accordance with one aspect of the present invention, the back-off window is based on a product of the number of collisions that occurred within the previous back-off window and an average of the number of users involved in a collision. In accordance with another aspect of the present invention, the back-off window is based on the product of the number of collisions that occurred within the last back-off window and a value of approximately 2.3922.

In accordance with another embodiment of the present invention, a method of resolving data collision in a network shared by a plurality of users comprises the steps of sending a first back-off window to a plurality of users of the network, calculating a second back-off window based at least in part on a number of users that collide while attempting to reserve network resources during a first back-off window, sending the second back-off window to one or more of the plurality of users of the network, and limiting network reservation attempts in the second back-off window to users that collide while attempting to reserve network resources during the first back-off window.

In accordance with yet another embodiment of the present invention, a system for resolving data collisions in a shared network comprises a plurality of remote devices, and an access point in communication with the plurality of remote devices. The access point preferably comprises a switch for communicating with the plurality of remote devices, a transceiver for sending information to and receiving information from the plurality of remote devices, and a collision resolution device communicably coupled to the transceiver and the switch, wherein the collision resolution device sends an initial back-off window to a plurality of remote devices. The system is further characterized in that the collision resolution device calculates and sends a subsequent back-off window in response to a number of collisions in the initial back-off window, and the collision resolution device limits the remote devices that can compete for network resources in the subsequent back-off window to remote devices that successfully attempted to reserve network resources in the initial back-off window. The initial back-off window is preferably based on an estimate of remote devices competing for network resources. In accordance with that aspect of the invention, the back-off window is calculated based on a product of the number of collisions that occurred within the initial back-off window and an average of the number of remote devices involved in a collision. In accordance with another aspect of the invention, the back-off window is based at least in part on a product of the number of collisions that occurred within the previous back-off window and a value of approximately between 2 and 3.

BRIEF DESCRIPTION OF THE DRAWINGS

Figure 1:
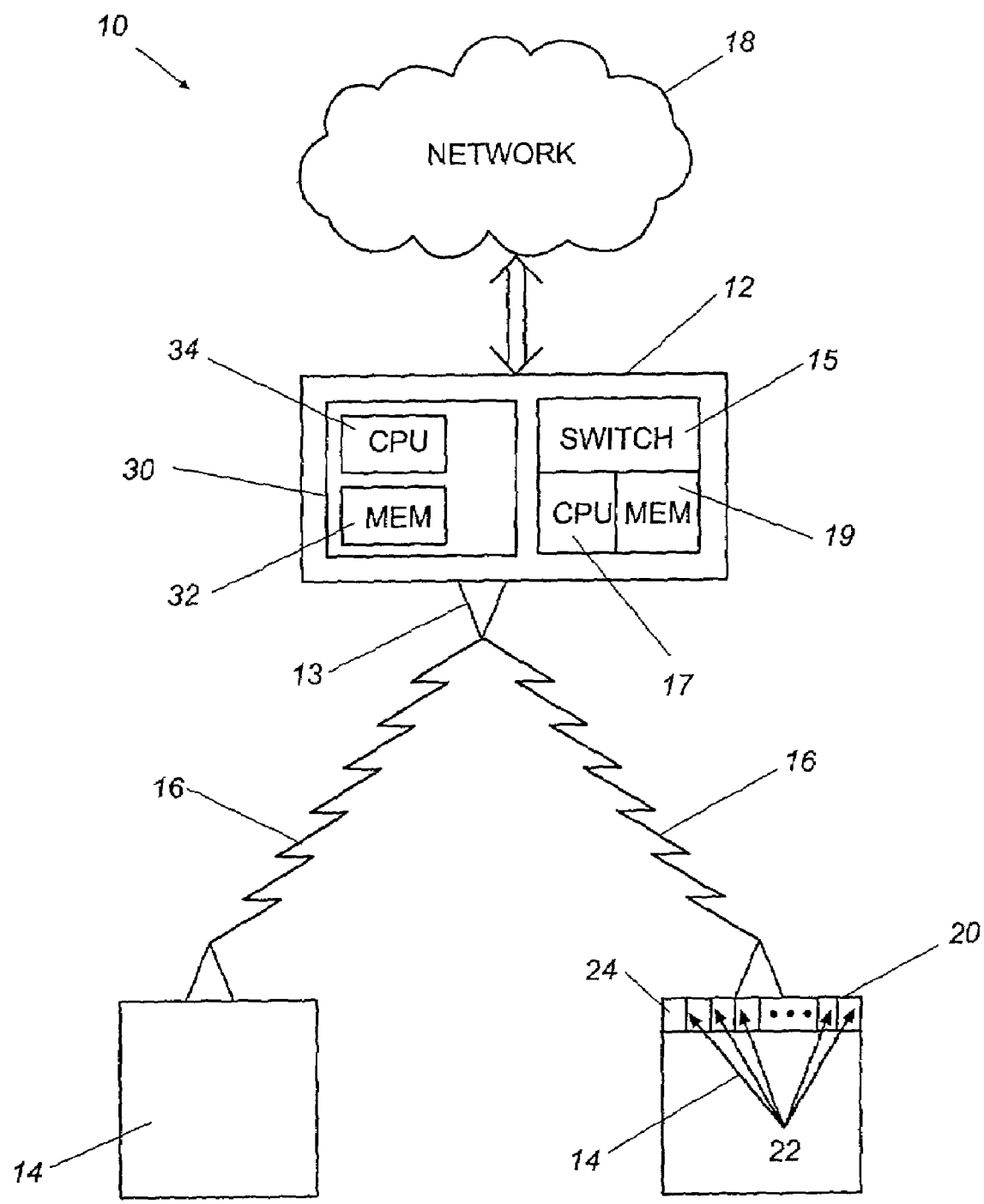

Having thus described the invention in general terms, reference will now be made to the accompanying drawings, which are not necessarily drawn to scale, and wherein:

FIG. 1 is a schematic illustration of a communication network; and

Figure 2:
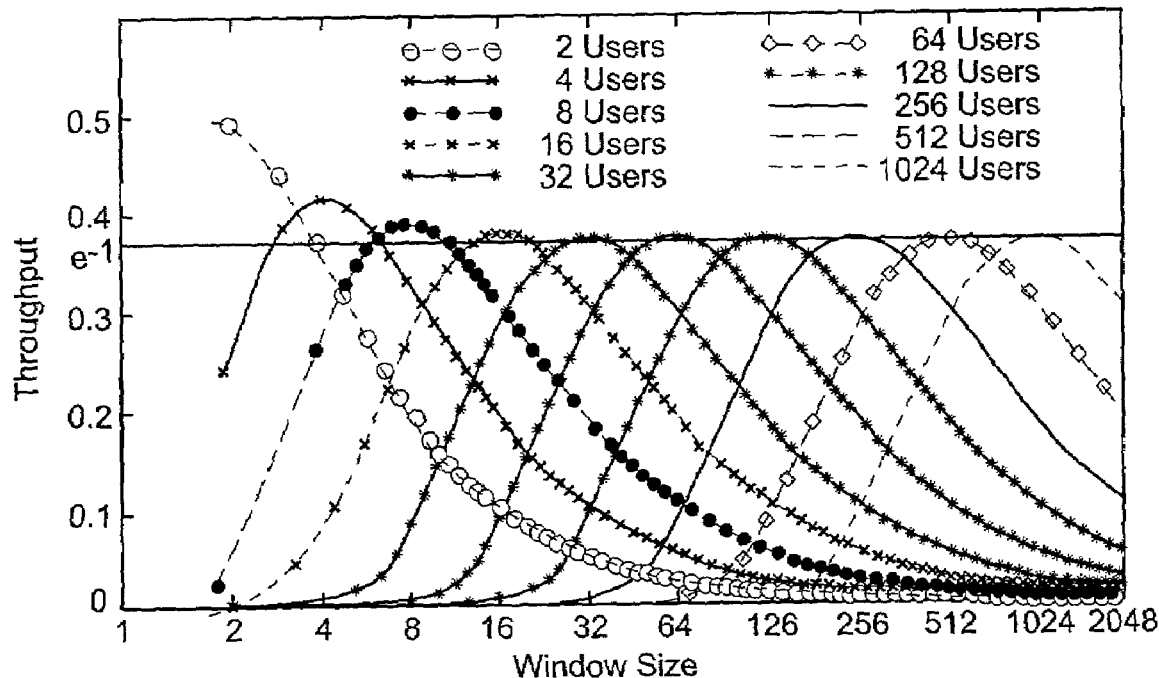

FIG. 2 is a graph that relates throughput to back-off window size for varying numbers of active users.

Figure 3:
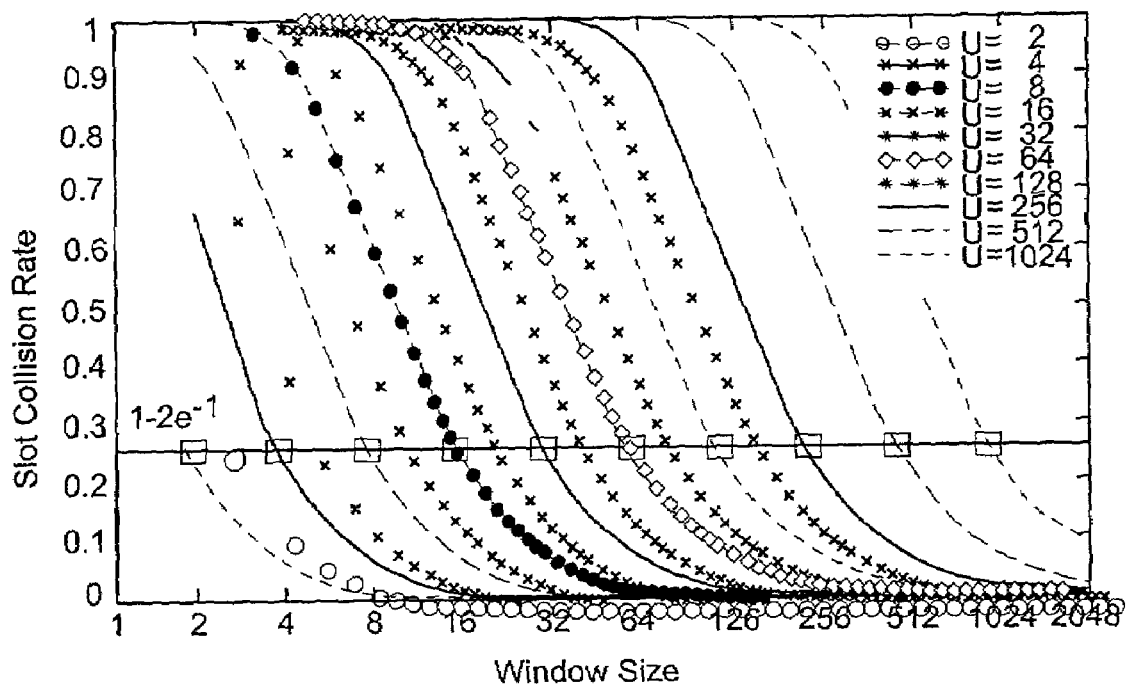

FIG. 3 is a graph that relates slot collision rate to back-off window size for varying numbers of users.

Figure 4:
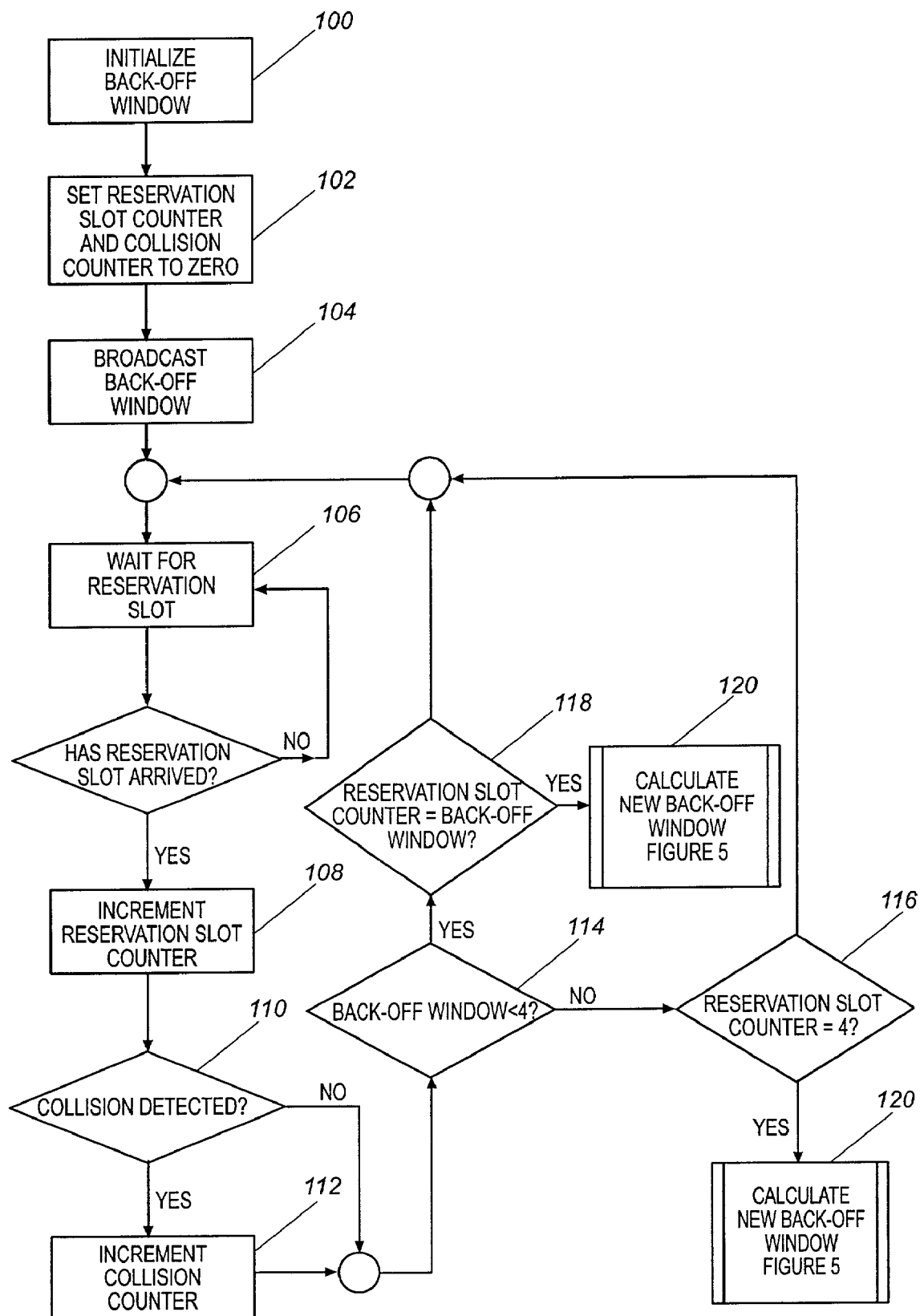

FIG. 4 is a flowchart illustrating a method in accordance with a fixed collision rate algorithm that allows an access point to track reservation slots and collisions.

Figure 5:
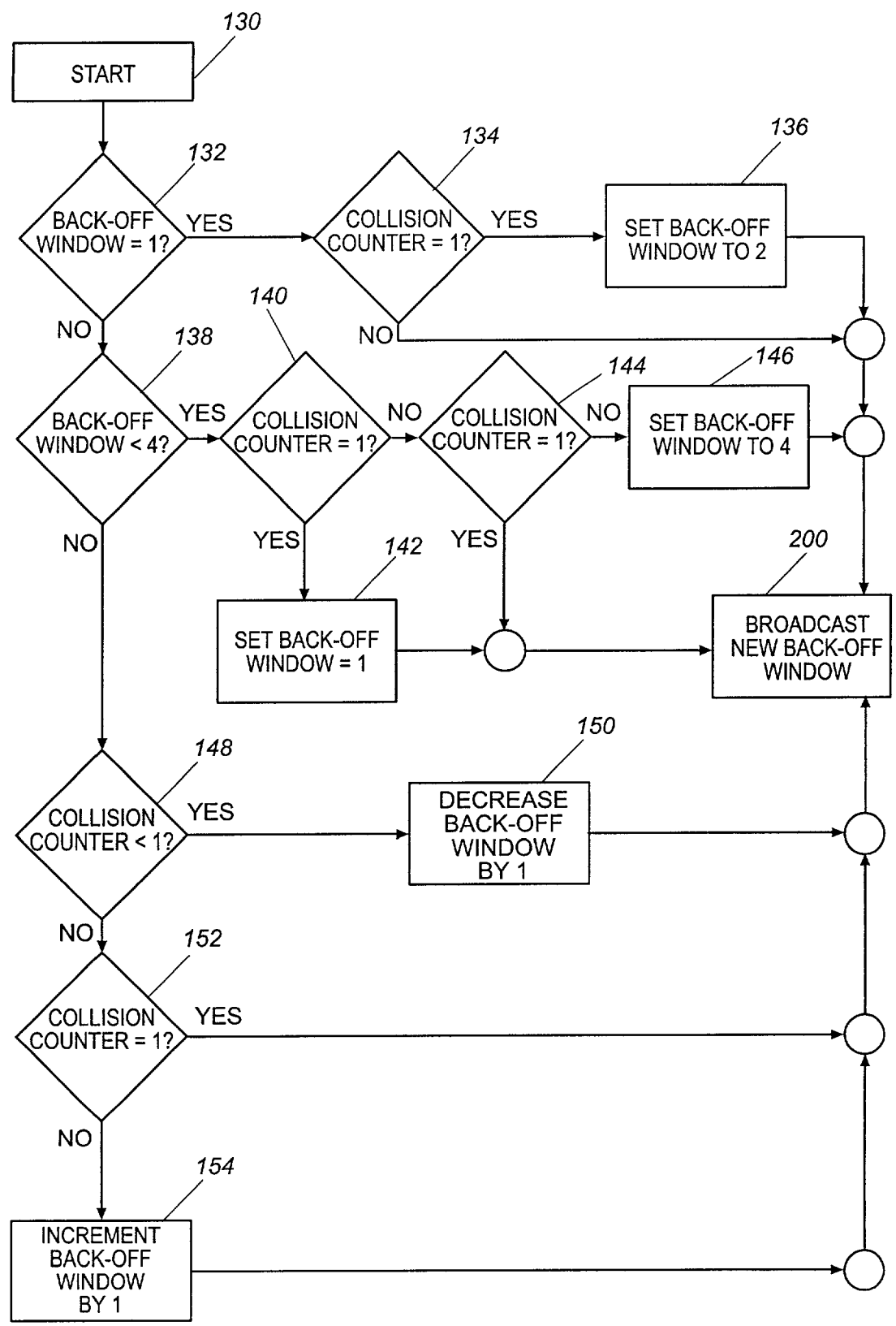

FIG. 5 is a flowchart illustrating a method in accordance with a fixed collision rate algorithm that allows an access point to dynamically adjust the back-off window.

Figure 6:
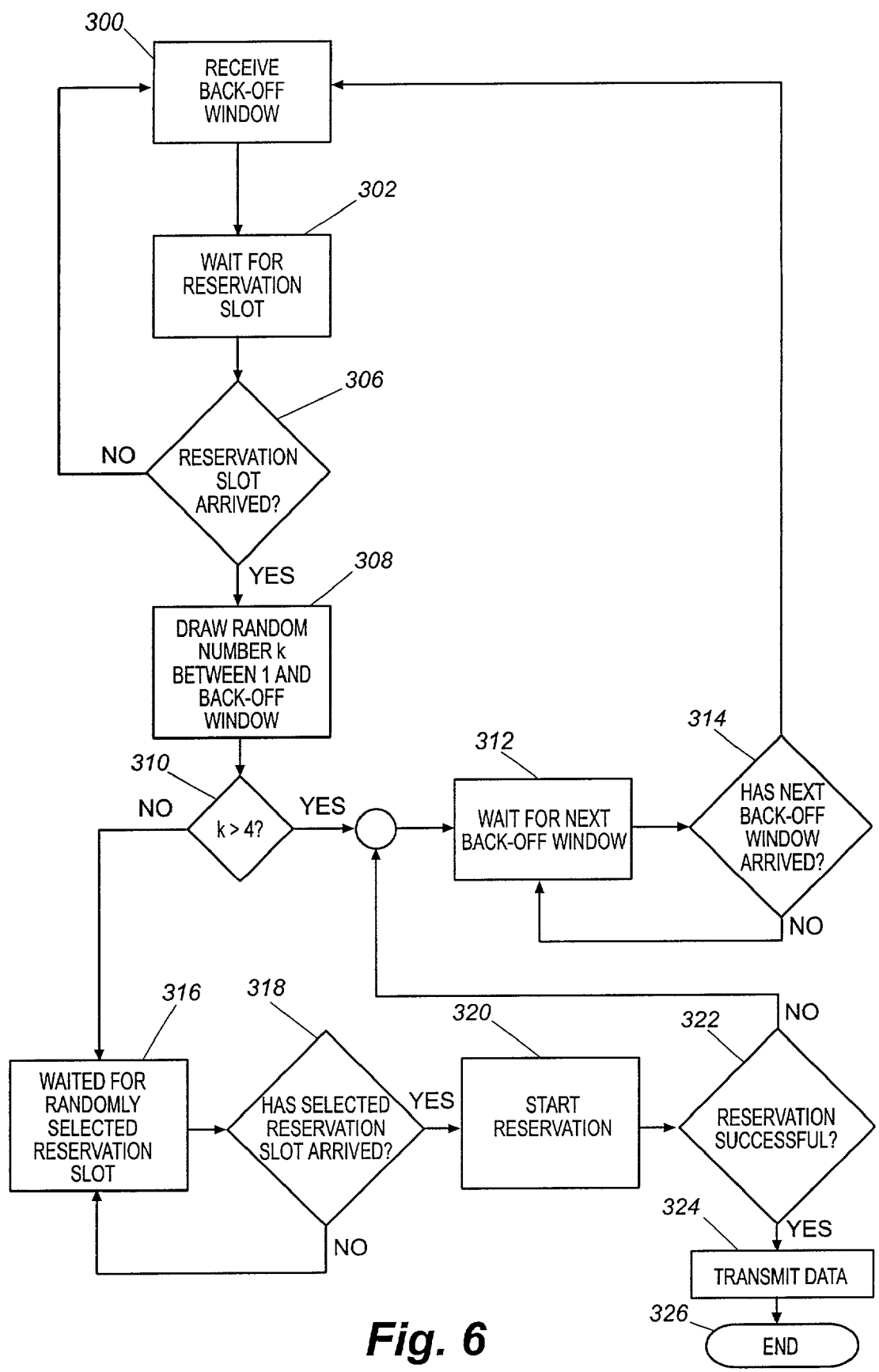

FIG. 6 is a flowchart illustrating the process flow of a fixed collision rate algorithm from the point of view of the wireless device.

Figure 7:
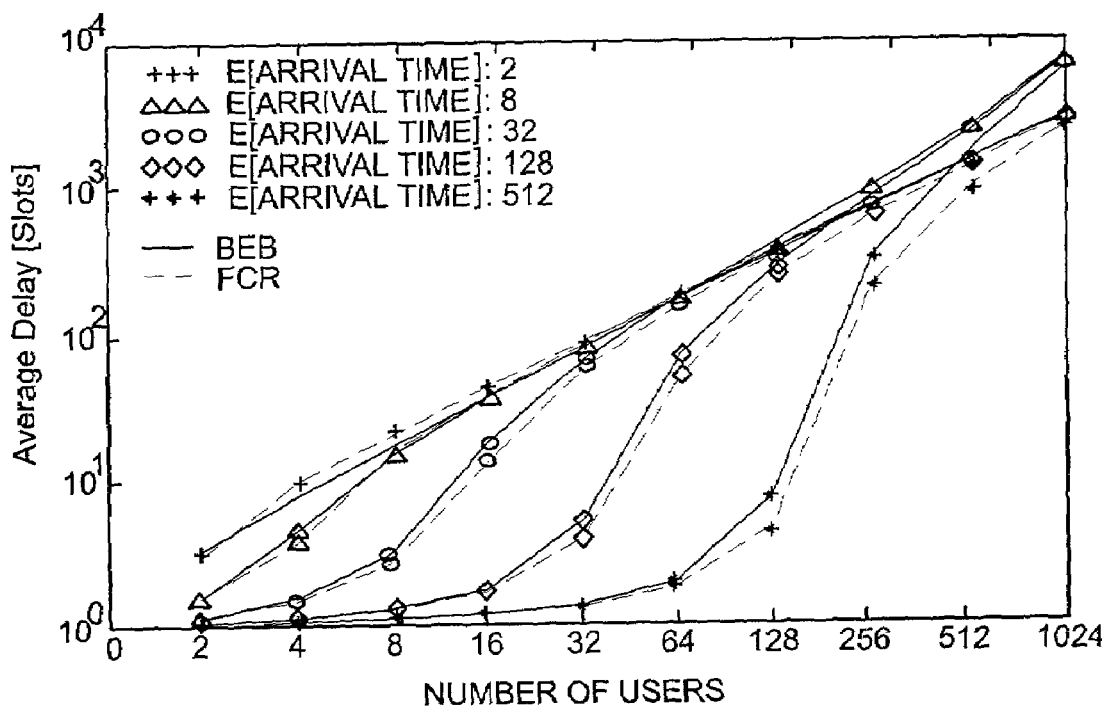

FIG. 7 is a graph that compares the average packet delay of a fixed collision rate algorithm with that of a BEB algorithm.

Figure 8:
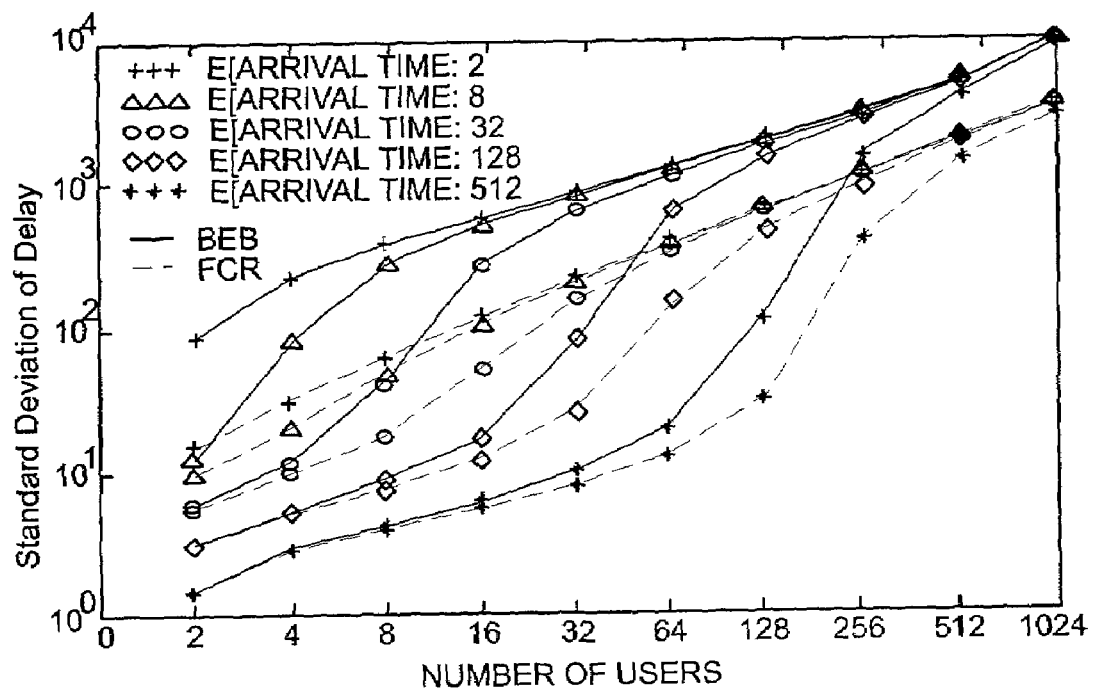

FIG. 8 is a graph that compares the standard deviation of delay of a fixed collision rate algorithm with that of a BEB algorithm.

Figure 9:
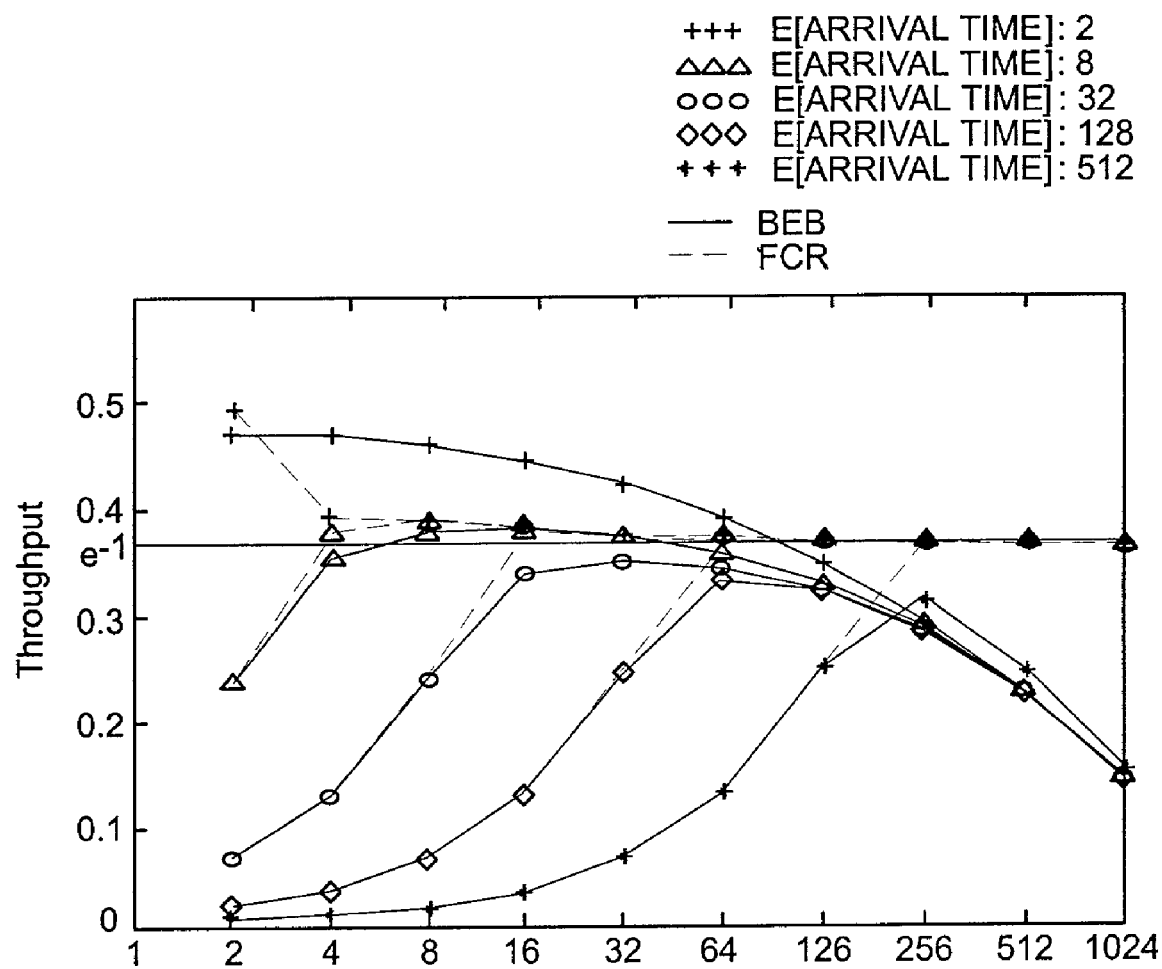

FIG. 9 is a graph that compares the throughput of a fixed collision rate algorithm with that of a BEB algorithm.

Figure 10:
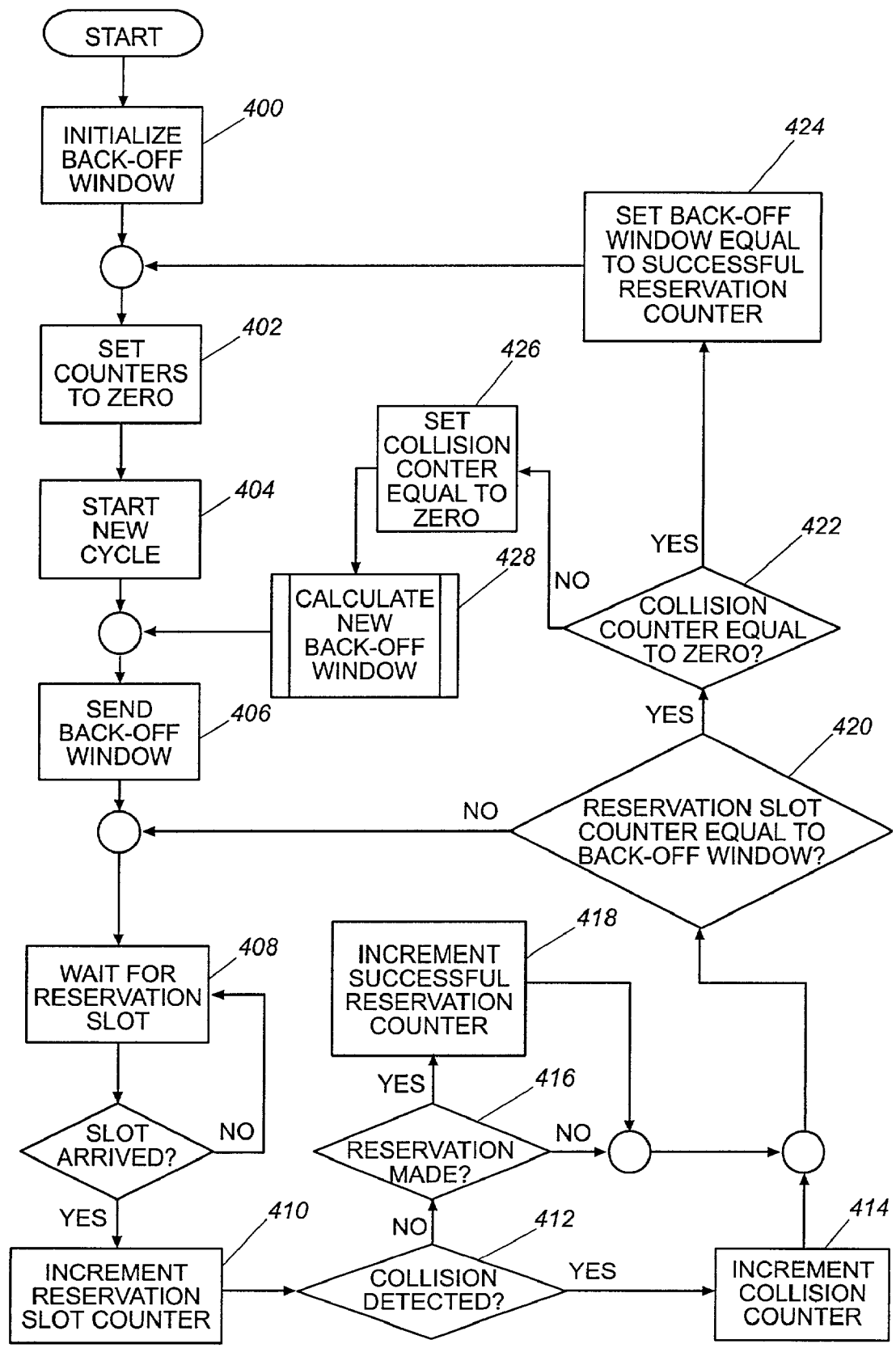

FIG. 10 is a flowchart illustrating a method in accordance with an embodiment of the present invention that allows an access point to dynamically adjust the back-off window in accordance with a near optimal fairness back-off algorithm.

Figure 11:
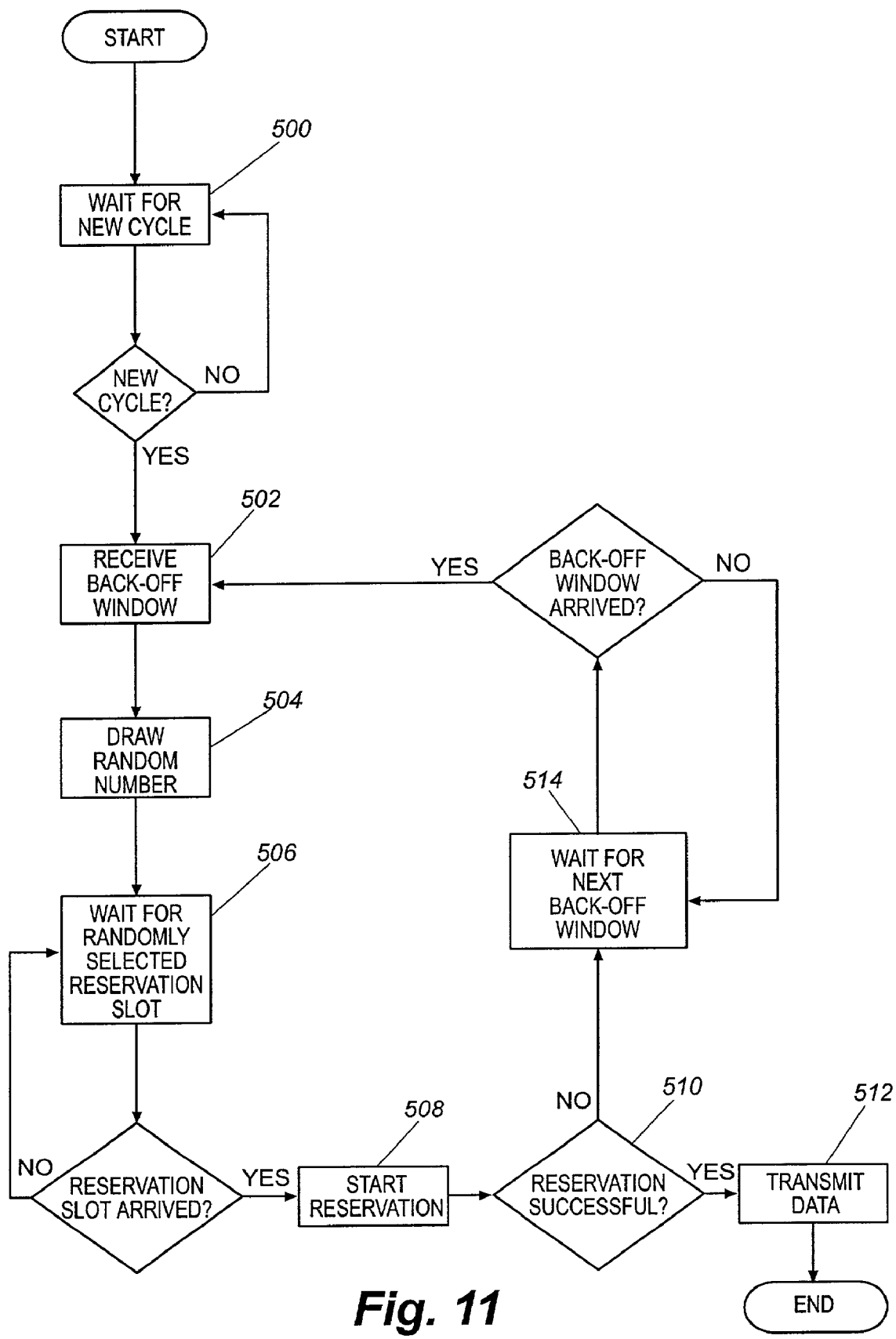

FIG. 11 is a flowchart illustrating the process flow of a near optimal fairness back-off algorithm from the point of view of a wireless device in accordance with an embodiment of the present invention.

Figure 12:
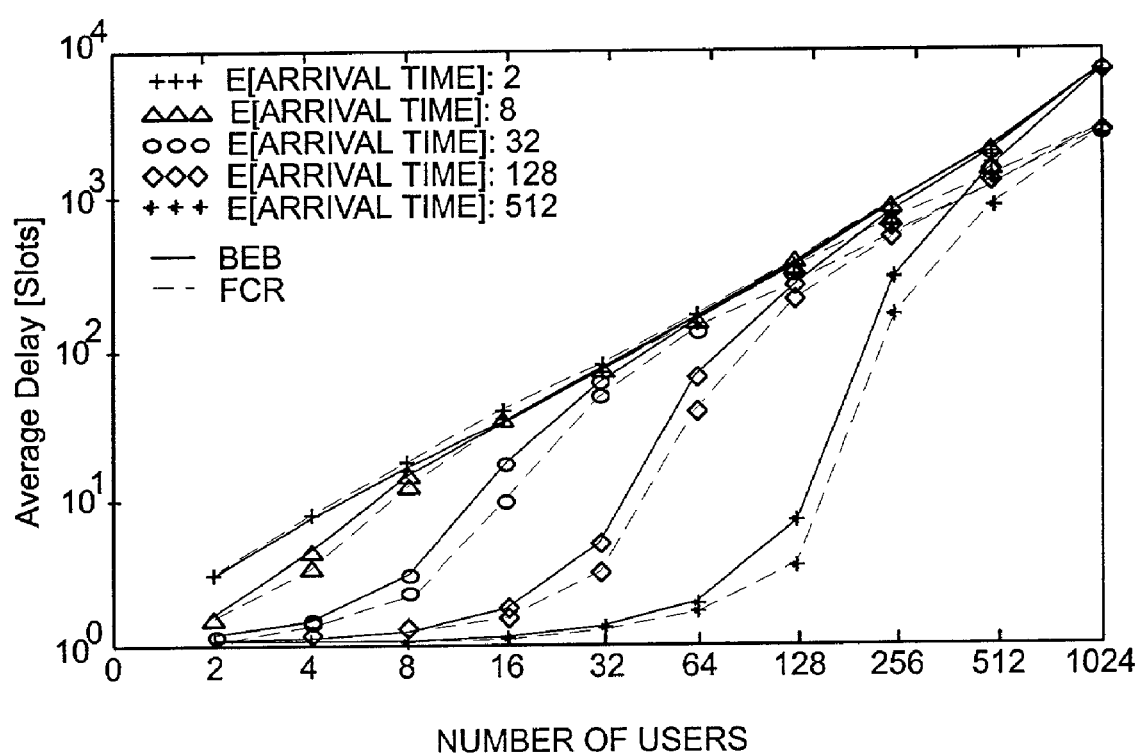

FIG. 12 is a graph that compares the average packet delay of a BEB back-off algorithm with that of a near optimal fairness back-off algorithm in accordance with an embodiment of the present invention.

Figure 13:
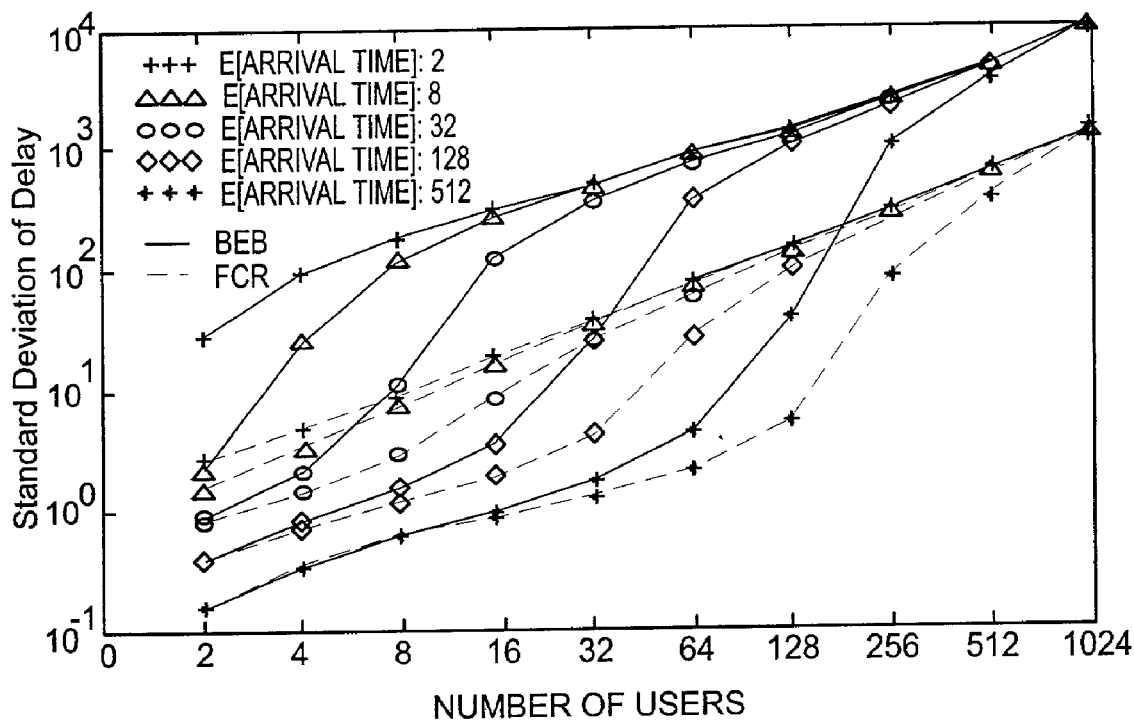

FIG. 13 is a graph that compares the standard deviation of delay of a BEB back-off algorithm with that of a near optimal fairness back-off algorithm in accordance with an embodiment of the present invention.

Figure 14:
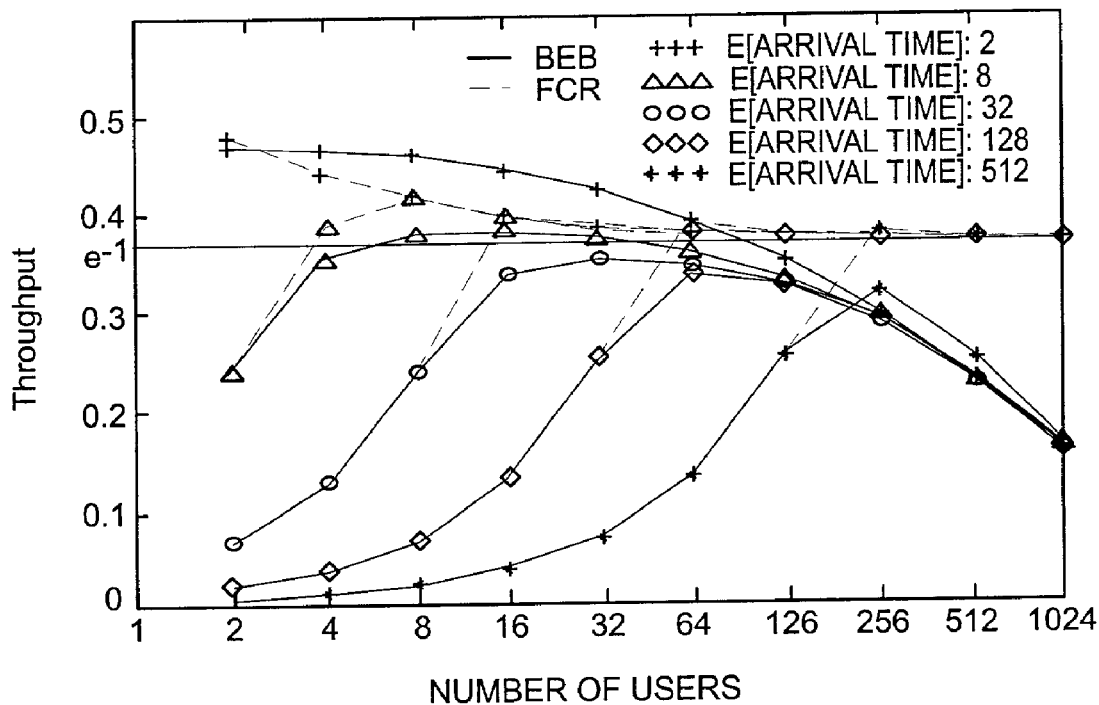

FIG. 14 is a graph that compares the throughput of a BEB back-off algorithm with that of a near optimal fairness back-off algorithm in accordance with an embodiment of the present invention.

Figure 15:
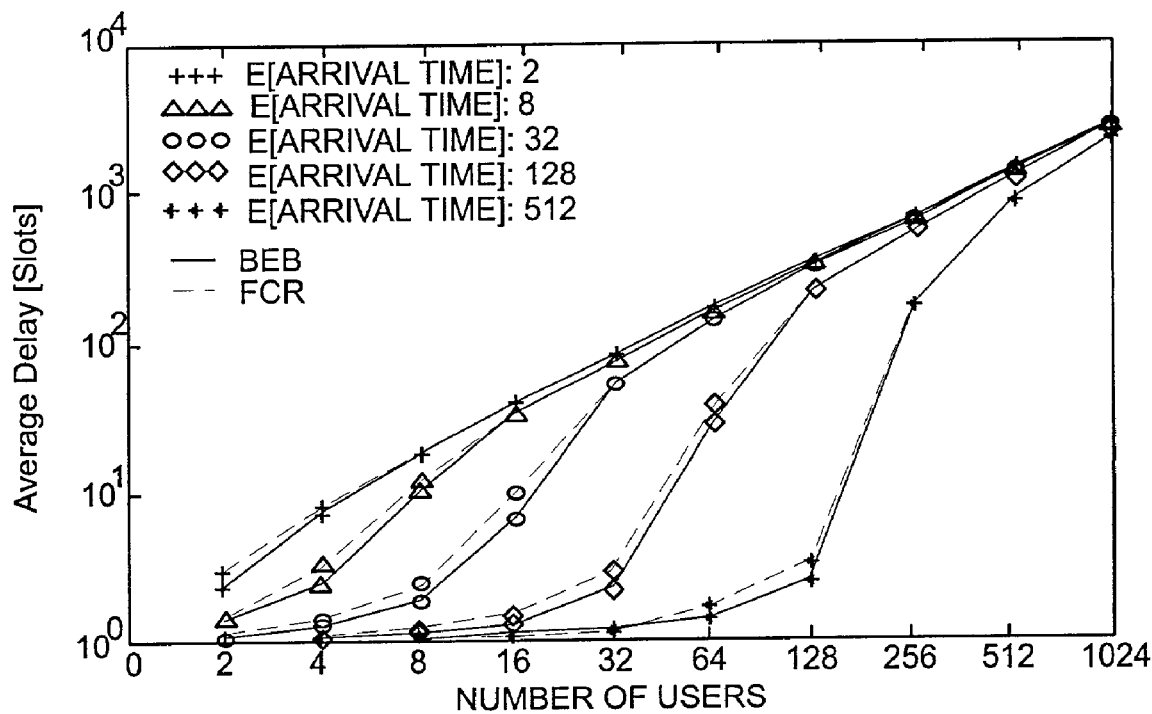

FIG. 15 is a graph that compares the average packet delay of an optimal system with that of a near optimal fairness back-off algorithm in accordance with an embodiment of the present invention.

Figure 16:
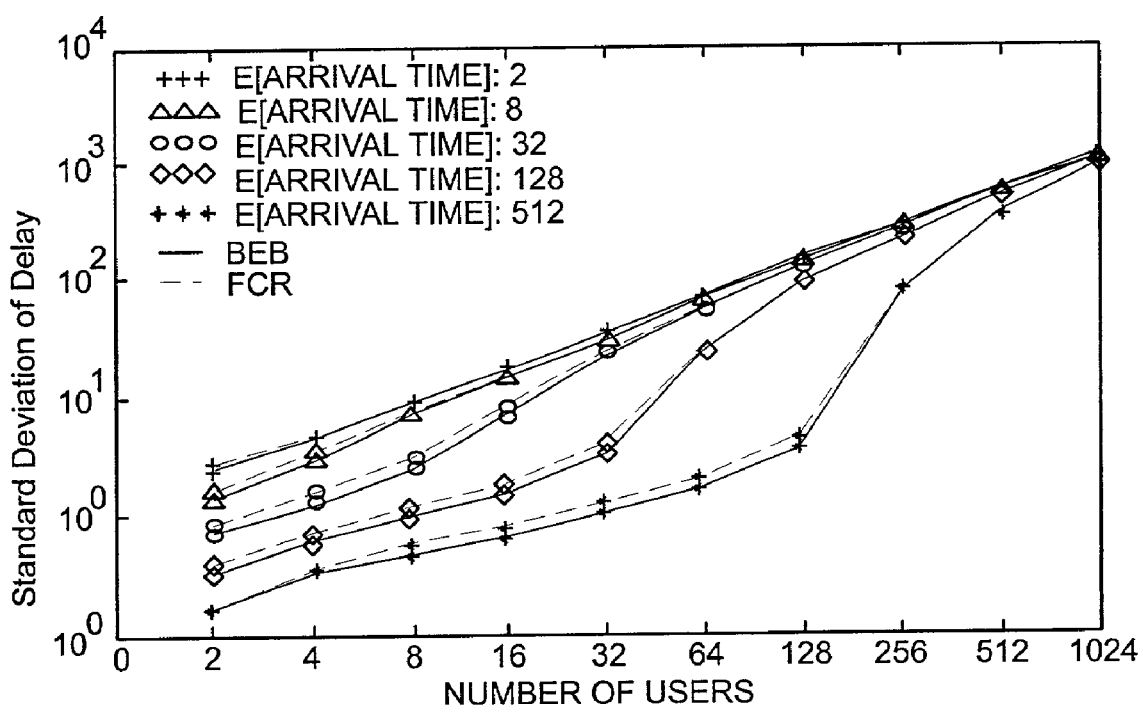

FIG. 16 is a graph that compares the standard deviation of delay of an optimal system with that of a near optimal fairness back-off algorithm in accordance with an embodiment of the present invention.

Figure 17:
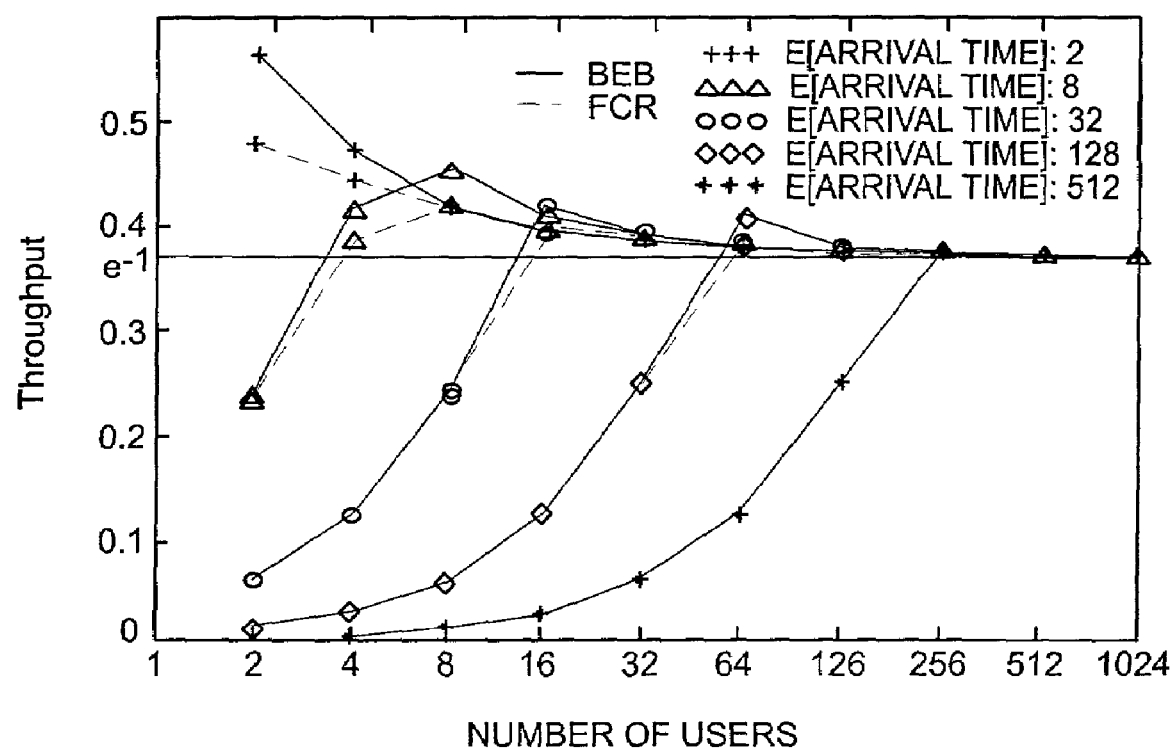

FIG. 17 is a graph that compares the throughput of an optimal system with that of a near optimal fairness back-off algorithm in accordance with an embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

I. Architecture

In the following paragraphs, the present invention is described in terms of a wireless internet access system. This is for illustration purposes only. It will be readily apparent to one of ordinary skill in the art that the present invention can be applied in any network environment that uses slotted and time-sharing protocols, including without limitation cable television ("CATV"), packet resolution multiple access systems ("PRMA") and any generic time-division multiplexing system.

With reference to FIG. 1, a wireless internet access system 10 includes an access point 12 in communication with a plurality of wireless devices 14, such as personal digital assistants, cell phones or any other computing device equipped with a wireless modem. A wireless communications link 16 communicatively couples the wireless devices 14 to the access point 12, preferably via a bi-directional link. The access point 12 sends information to and receives information from the plurality of wireless devices 14 via a transceiver 13. The access point 12 operates as a base station to a network 18 and includes a collision resolution device 30 (the operation of which is described in sections II and III below) which, in accordance with the present invention, controls data contentions between users. The access point 12 may further include such elements as a switch 15 and a microprocessor 17 with associated memory 19 to control the switch and provide access to the network 18. For purposes of illustrating the preferred embodiment, the communication from the access point 12 to the wireless devices 14 occurs in the downstream direction and is controlled and scheduled by the access point 12. Communication in the upstream direction, from the wireless devices 14 to the access point 12, occurs through reservation slots of a demand-assignment protocol (discussed below).

Each wireless device 14 using the wireless communication link 16 has a transmission queue 20 for holding data packets 22 that the device needs to transmit. For example, as seen in FIG. 1, the wireless device 14 has an earliest packet 24 placed in the transmission queue 20. The packet 24 will be the first transmitted once the communication link 16 is available to the access point 12.

When a packet arrives at the head of the transmission queue 20, the wireless device 14 reserves bandwidth on the wireless communications link 16 through reservation slots. There is competition between wireless devices 14 as they attempt to make a reservation in a reservation slot and packet collision can occur. If a wireless device 14 makes a successful reservation and the access point 12 receives the packet 24 without collision or error, the access point 12 allocates bandwidth for data transmission and the wireless device 14 transmits its data in the allocated bandwidth without risk of collision. If, however, two or more wireless devices 14 simultaneously attempt to make a reservation in the same reservation slot, the packets collide and neither reservation succeeds. When this happens, the two or more wireless devices 14 must back-off and wait a random period of time before attempting another reservation.

In one embodiment, the collision resolution device 30 checks the status of each reservation slot to determine whether a collision has occurred and recalculates the back-off window in accordance with the fixed collision rate (FCR) algorithm to maintain a substantially constant collision rate of 1-2/e and thereby maximize throughput. In FCR, the collision resolution device 30 maintains a substantially constant collision rate of 0.25, which is relatively close to 1-2/e (~0.2642). The collision resolution device 30 estimates the collision rate of the system by determining whether a collision occurred in a given reservation slot. When more than 25% of the reservation slots are in collision, the collision resolution device 30 increases the size of the back-off window and when less than 25% of the reservation slots are in collision, the back-off window is decreased. The collision resolution device 30 sends the recalculated back-off window to the access point 12 and the access point 12 sends the new back-off window to the remote devices 14.

In another embodiment, the collision resolution device 30 handles data contention resolution using the Near Optimal Fairness (NOF) algorithm. Like the FCR algorithm, the NOF algorithm calculates an optimal back-off or contention window and the access point 12 broadcasts the common window to all users competing for system bandwidth. But the NOF algorithm handles data contentions in cycles and guarantees that every user will make a successful reservation before the cycle ends. At the start of a cycle, the access point 12 sends a common back-off or contention window to users. The size of the window is equal to the number of successful reservations in the previous cycle and functions as an estimate of the number of competing users in the current cycle. Users attempt reservations in the available reservations slots. Some succeed and others collide. A new back-off window is calculated based on the number of users that collided and the users that collided attempt another reservation. The process continues until every user that competed for bandwidth at the start of the cycle has made a successful reservation. Users that requested bandwidth mid-cycle and users that successfully made reservations earlier in the cycle cannot attempt to reserve a reservation slot until the next cycle begins.

As described herein, the FCR and NOF algorithms are implemented via software stored in memory 32 wherein the collision resolution device 30 uses a central processing unit 34 to interact with the memory 32 and execute the algorithm. But it will be readily apparent to one skilled in the art that the computer instructions that execute the algorithm can be implemented in hardware, software or firmware. The computer instructions may be loaded onto a general purpose computer, a special purpose computer, or any other programmable data processing apparatus to produce a machine, such that the instructions which execute on the computer or other programmable data processing apparatus create means for implementing the functions specified herein.

II. Operation

The following paragraphs describe in detail the FCR algorithm, a new method of collision resolution according to an embodiment of the present invention, and describe FCR in the context of the wireless internet access system of FIG. 1. The disclosed method can be implemented on many different systems because, unlike the tree and p-persistence algorithms, the FCR back-off algorithm does not require that individual users have full knowledge of the status of every other channel in the network. In that respect, at least, the present invention is more akin to a BEB algorithm than either the tree or p-persistence algorithms. FCR, however, avoids many of the performance problems, such as instability and capture effect, that occur with BEB.

Another difference between FCR and other back-off algorithms known in the art is that FCR assigns the same back-off window to every user in the network. This means that every user will have the same chance of obtaining network resources regardless of how many times the user's data has previously collided. FCR thus shares the network resources in a fairer way and, at the same time, avoids the capture effect found in BEB.

FCR maintains a high throughput by periodically recalculating the common back-off window and sending the new back-off window to users. FCR recalculates the back-off window based on one or more operational characteristics of the network. For example, in one embodiment FCR recalculates the back-off window to maintain collision rate. In another embodiment, back-off window size corresponds to the number of users on the system.

The inventors of the present invention determined through Monte Carlo simulation techniques that maximum throughput occurred on a wireless internet network when the number of active users in the network equaled the size of the back-off window. They also discovered that when throughput was maximized, the collision rate of the network stayed constant at 1-2/e and that this collision rate remained constant as the number of active users on the network increased. These discoveries were confirmed mathematically.

The inventors ran Monte Carlo simulations to calculate throughput for a different number of active users U using different back-off windows (represented as W). Note that as used in the following discussion of the simulation results, "users" and "active users" are differentiated. Users are recognized by the system but are idle or otherwise not competing for channel bandwidth. Active users, on the other hand, are those users that have packets waiting in the queue for immediate transmission and are competing with other active users for channel bandwidth. The results of the active user-throughput simulations are seen in FIG. 2, for U=2, 4, 8, 16, 32, 64, 128, 256, 512 and 1024. The first conclusion drawn from FIG. 2 is that maximum throughput occurs when U=W (when the number of active users equals the back-off window). The second conclusion drawn from FIG. 2 is that, as the number of active users approaches infinity, the maximum achievable throughput approaches 1/e=0.3679. Thirdly, when the number of active users is small, a higher throughput is possible. For example, FIG. 2 shows that when two active users compete for bandwidth, a throughput of as high as 0.5 is attainable.

The graph of FIG. 3 is another product of the Monte-Carlo simulations. FIG. 3 compares slot collision rate to back-off window size (W) for U=2, 4, 8, 16, 32, 64, 128, 256, 512 and 1024. As used here, slot collision rate is the ratio of slots in collision to the total number of slots. FIG. 3 shows that the slot collision rate is a decreasing function of back-off window size. Note that squares are used to show the value of slot collision rate at the point where W=U and that when the number of active users equals the back-off window size, slot collisions occur at an almost constant rate of 1-2/e~0.2642. Importantly, the slot collision rate remains almost constant as the number of active users on the system increases.

The following paragraphs provide the mathematical derivation that underlies the Monte Carlo simulation results set forth in FIGS. 2 and 3.

Let n be the number of active users. If P is the probability that an active user will pick reservation slot number 1, where the active user is randomly picking a number between 1 and the back-off window W, then p=1/W. Where, as here, all active users are assigned the same back-off window, the number of active users picking contention slot 1 has a binomial distribution with parameters p and n, such that:

$P_0(1-p)^n$=Probability that no user picks reservation slot one, and $P_1=np(1-p)^{n-1}$=Probability that one user picks reservation slot one.

Because throughput occurs when a single active user is the only active user to randomly select a particular reservation slot, the probability of throughput can be represented as $P_1=np(1-p)^{n-1}$. In this equation, $P_1$ is a unimodal function in p and has a peak value of $P_{1max}=(1-1/n)^{n-1}$ when p=1/n. Throughput, then, is maximized when the back-off window equals the number of active users and, as n approaches infinity, $P_{1max}=(1-1/n)^{n-1}\rightarrow 1/e$.

The other side of the equation is that a collision occurs when more than one active user selects the same reservation slot to make a reservation. The probability of a collision occurring (the collision probability C) can be represented as:

$$C=1-P_0-P_1=1-(1-p)^n-np(1-p)^{n-1}=1-(1-p)^{n-1}(1+(n-1)p).$$

Notably, as the number of active users approaches infinity, the collision probability approaches 1-2/e~0.2624. Moreover, when throughput is maximized, that is, when W=U and p=1/n, the probability of collision approaches 1-2/e for all n values and can be represented as:

$$C_{opt} = 1 - (1 - 1/n)^{n-1}(2 - 1/n),$$

where $C_{opt}$ is the probability of collision at maximum throughput.

The foregoing simulation and mathematical analysis demonstrate that maximum throughput occurs when the back-off window size equals the number of active users on the system and, when this state of maximum throughput is reached, packet collisions occur at a constant rate of 1-2/e.

In practice, few systems have the ability to track either the number of active users or the slot collision rate. The inventors sought to come up with a new back-off algorithm that does not require a smart system, that is, a system with full knowledge (idle, success, collision) of the status for every channel on the system. To that end, they developed the FCR algorithm which accurately estimates slot collision rate using channel status information that is available in any centrally controlled system. FCR then dynamically recalculates the back-off window to maintain an estimated collision rate of approximately 1-2/e~0.2642. This, in turn, ensures that the system operates at maximum throughput.

An embodiment of the method according to the present invention is described in detail in the following paragraphs. The embodiment is described in terms of a wireless internet access system, but those skilled in the art will readily recognize that FCR can be used in any shared network environment that uses slotted and time-sharing protocols.

In the described embodiment, a new back-off window is broadcast at least every four reservation slots. These four reservations slots are referred to herein as the history length of reservation. The history length of reservation is the number of reservation slots that are used by FCR to estimate the slot collision rate. Four reservation slots are used because 0.25 is relatively close to the target slot collision rate of 1-2/e~0.2642. However, it will be readily apparent to those of ordinary skill in the art that the history length of reservation can be adjusted to more accurately estimate the slot collision rate or to broadcast back-off windows with greater frequency. While an increase in the size of the history length of reservation provides a more accurate estimate of collision rate, a larger history length means that the back-off window is adjusted less frequently. Simulation results show that using other history lengths of reservation does affect performance; however, increases in throughput were minimal.

FIG. 4 is a flow diagram that summarizes how FCR uses reservations slots and collision counters to estimate the slot collision rate and to dynamically adjust the back-off window broadcast to all wireless devices 14 (active users).

With reference to FIG. 1 and FIG. 4, a starting back-off window is initialized in Step 100. An initial back-off window of one is often used. In Step 102, a reservation slot counter and a collision counter are set to zero. The reservation slot counter tracks the total number of reservation slots and the collision counter tracks the number of reservation slots that resulted in collision. As discussed, a reservation slot is a portion of the data channel used by the wireless devices 14 to reserve bandwidth on the channel. Once a wireless device 14 makes a successful reservation, the access point 12 allocates bandwidth for data transmission and the wireless device 14 uses the bandwidth to transmit data upstream to the access point 12. Collisions occur in the reservation slot when two or more wireless devices 14 attempt to reserve the same reservation slot simultaneously.

Once the back-off window is initialized and the reservation and collision counters are set to zero, the access point 12 broadcasts the back-off window to the wireless devices 14 (Step 104) and waits for the next reservation slot (Step 106).

When the reservation slot arrives, the reservation slot counter is incremented by one (Step 108) and a determination is made whether a collision occurred in the reservation slot. Multiple methods to detect collisions are known by those with ordinary skill in the art and an exhaustive review of those methods is beyond the scope of this document. In essence, if the access point 12 receives garbled data or data otherwise in error, FCR assumes a packet collision has occurred and increments the collision counter by one (Step 112).

The access point 12 does not broadcast a new back-off window until a sufficient number of reservation slots have been received to estimate the slot collision rate. In this embodiment, the history length of reservation is four; therefore, if the reservation counter has not reached four (Step 116), FCR returns to step 106 and waits for the next reservation slot to arrive. An exception to this rule occurs when the back-off window size is less than the history length of reservation (Step 114). In this embodiment, if the back-off window is less than four and the reservation counter is less than the back-off window, FCR returns to step 106 and waits for the next reservation (Step 118). When, however, the back-off window is less than four (Step 114) and the reservation counter equals the back-off window (Step 118), FCR estimates the slot collision rate, calculates a new back-off window (Step 120) and the access point 12 broadcasts the new back-off window.

FIG. 5 is a flow diagram that shows an illustrative method of the operation of FCR estimating the slot collision rate and using that estimate to calculate a new back-off window in accordance with an embodiment of the present invention. As already explained, the estimate and back-off window calculation (Step 130) occur when either: a) the reservation counter reaches the history length of reservation, or b) the back-off window is less than the history length of reservation and the reservation counter equals the back-off window.

In Step 132, FCR checks the size of the back-off window. A back-off window of one means that the access point 12 has received only one reservation slot since the last back-off window was broadcast. In Step 134, FCR checks the collision counter to see if a collision occurred in the single reservation slot that was received. If there was no collision, FCR proceeds to Step 200 and the access point 12 broadcasts the same back-off window (size one) to the wireless devices 14. If, on the other hand, there was a collision (collision counter equals two), FCR increases the back-off window to two (Step 136) and the access point 12 broadcasts the larger back-off window (Step 200).

If the back-off window is greater than one but less than four (Step 138), FCR proceeds to Step 140. At Step 140, the reservation slot counter has a value of either two or three and FCR checks the collision counter to determine how many collisions occurred in these slots. If zero collisions occurred, the back-off window is set to one (Step 142) and is broadcast (Step 200). If one collision occurred (Step 144), the back-off window is not changed and is re-broadcast (Step 200). Finally, if more than one collision occurred, the back-off window is set to four (Step 146) and is broadcast (Step 200).

In this embodiment, FCR reaches Step 148 when the size of the back-off window is greater than or equal to four (the history length of reservation). This means that four reservation slots have occurred since the last back-off window was broadcast. In Step 148, FCR checks the collision counter to determine how many collisions have occurred. If there have been no collisions, FCR decrements the size of the back-off window by 1 (Step 150) and broadcasts the smaller back-off window (Step 200). If a single collision occurred (Step 152), the back-off window is not changed and is re-broadcast (Step 200). Finally, if more than one collision occurred, the back-off window is incremented by 1 (Step 154) and is broadcast (Step 200).

FIG. 6 is a flow diagram that illustrates FCR from the point of view of one of the plurality of wireless devices 14. In Step 300, a wireless device 14 receives a back-off window. In Step 302, the wireless device 14 begins to wait for a reservation slot (access to the channel). If a reservation slot is desired, the wireless device 14 continues to wait until a slot arrives (Step 306). Once the reservation slot arrives, FCR proceeds to Step 308. In Step 308, the wireless device 14 randomly selects a number (k) between one and the size of the back-off window. For example, if the size of the back-off window is two, then the random selection will be either one or two. The random number identifies which of the upcoming reservation slots the wireless device 14 will use to attempt another reservation. In Step 310, FCR determines whether the random number selected in Step 308 is greater than four (the history length of reservation). If the random number is greater than four, the wireless device 14 will not attempt a reservation, but will wait (Step 312) for the next back-off window. When the new back-off window arrives (Step 314), the wireless device 14 returns to Step 300.

If the random number selected in Step 310 is less than four then FCR proceeds to Step 316 and the wireless device 14 waits for the reservation slot that corresponds to the randomly selected number (Step 318). When the randomly selected reservation slot arrives, the wireless device 14 attempts to make a reservation in the reservation slot (Step 320). The reservation succeeds if the wireless device 14 is the only device to attempt a reservation in the particular reservation slot. The reservation fails, however, and collision occurs, if two or more wireless devices 14 attempt a reservation in the same reservation slot. If the reservation is successful, the wireless device 14 is allocated channel bandwidth for data transmission (Step 324). Once the allocation is made, the wireless device 14 transmits the data in the queue. When the data transmission completes, FCR ends until the next collision (Step 326). If FCR determines in Step 322 that the reservation attempt of Step 320 failed, the wireless device 14 proceeds to Step 312 and waits for the next back-off window.

The apparatus and method according to the present invention provide a back-off algorithm that is superior in many ways to the other back-off algorithms known in the art. Unlike tree and p-persistence algorithms, FCR does not require that the network have full knowledge of the three possible statuses (idle, collision, success) for every channel in the network. As a result, FCR can be implemented with relative ease and little expense and is available for implementation on networks that do not provide the feedback required by the tree and p-persistence algorithms.

FCR has advantages over BEB as well. The graph in FIG. 7 compares the average packet delay of FCR and BEB. Arrival time, as used herein, measures how often active users attempt reservations. A low arrival time means that active users are aggressively seeking channel resources and, as a result, few reservation slots pass without a reservation attempt. In contrast, a higher arrival time means that active users are not attempting reservations as often and a relatively larger number of reservation slots pass between reservation attempts.

FIG. 7 shows that FCR has a smaller average packet delay under most traffic patterns and system loads. The single exception occurs when there are few active users on the system ($4 \leq U \leq 64$) and the few users that are active are aggressively acquiring bandwidth (mean arrival time=2 slots). Under these limited conditions, BEB appears to have a lower average packet delay than FCR. However, the successful transmissions that occur in BEB under these conditions are dominated by the capture effect. What is happening in these conditions is that a few users are transmitting with little collision and many more users are experiencing increasing back-off window sizes.

FIG. 7 also shows that the difference in average packet delay between FCR and BEB increases with an increase in the number of active users. The performance benefit of FCR thus increases as the number of active users increases. For example, when there are 1024 users, the worst average packet delay of FCR is 2780 slots, while the best case for BEB is 6177 slots.

FIG. 8 shows the differences in standard deviation of delay between FCR and BEB. Standard deviation of delay determines how equitably the system is sharing the channel bandwidth between active users. A small standard deviation of delay implies that packets wait approximately the same amount of time before being transmitted successfully and, therefore, bandwidth is shared among competing users in a fairer way. A large standard deviation of delay, on the other hand, implies that bandwidth is not being shared by the competing users equally. Thus, when capture effect is present, a large standard deviation occurs since some of the packets transmit with a small probability of collision, while other packets have increasing larger back-off windows and a lower probability of successful transmission.

As discussed above in reference to FIG. 7, simulations showed that FCB has a lower average packet delay that BEB under almost all system conditions. The single exception occurs when there are a small number of active users that are aggressively competing for bandwidth. FIG. 8 reveals the reason for BEB's lower average packet delay under these particular conditions. When there are few users aggressively competing for bandwidth, BEB has a very large standard deviation of delay. This means that the lower average packet delay in these limited conditions is the result of capture effect. The figure shows that under these same conditions, FCR has a much lower standard deviation of delay than BEB and, therefore, does not experience capture effect. FIG. 8 further shows that FCR continues to have a lower standard deviation of delay as the number of active users increases and therefore, FCR consistently shares the system resources in a significantly fairer way.

FIG. 9 compares throughput for FCR and BEB. This figure shows that capture effect causes BEB to have a much higher throughput in the limited condition where there are few active users aggressively acquiring bandwidth. In all the other cases, FCR has a higher throughput than BEB, or there is negligible difference. Notably, FCR maintains a throughput of $1/e \sim 0.3679$ without regard to the number of active users on the network.

In concluding the detailed description of the FCR algorithm, it should be noted that it will be obvious to those skilled in the art that many variations and modifications can be made to the preferred embodiment without substantially departing from the principles of the present invention. These variations and modifications are intended to be included herein within the scope of the present invention as set forth in the appended claims. Further, in the claims hereafter, the structures, materials, acts, and equivalents of all means or step-plus function elements are intended to include any structure, materials or acts for performing their cited functions.

III. Alternate Embodiment

The following paragraphs describe in detail the operation of the NOF algorithm, an alternate embodiment of the present invention. Similar to the FCR algorithm, NOF can be implemented on a variety of systems, as it does not require that individual users have full knowledge of the status of every other channel in the network. Moreover, NOF avoids many of the performance problems, such as instability and capture effect, that occur with other contention resolution algorithms known in the prior art. NOF is also similar to FCR in that it assigns a common back-off or contention window to all competing users, thereby guaranteeing that all users have the same chance of obtaining network resources regardless of how many times the user has previously collided while attempting to reserve bandwidth. NOF goes further by operating in cycles and insuring that in general every user will make a successful reservation before the next cycle begins.

In a preferred embodiment, a cycle does not end until every user has made a successful reservation. In this embodiment, a cycle is initiated by the access point 12 and indicates to the users that they can attempt to reserve bandwidth. Users that are ready to transmit when the cycle begins will make reservation attempts during the cycle, while users that are not ready to transmit at the start of a cycle must wait until the next cycle to reserve bandwidth. Typically, as a cycle proceeds some users make successful reservation attempts and others collide. Because new users cannot compete with bandwidth until the start of the next cycle, as the cycle proceeds, the number of users attempting reservations decreases and users that have previously collided have a greater likelihood of reserving bandwidth. The cycle does not end until every user has successfully reserved bandwidth. Thus, cycle lengths most likely will vary. When a few users are competing for resources a cycle can be very short. But as the number of users actively contending for network resources increases, the length of the cycle also increases.

FIG. 10 is a flow diagram that describes the operation of an embodiment of the NOF algorithm in accordance with the present invention. A starting back-of window is initialized in Step 400. In Step 402, the reservation slot counter, successful reservation counter and collision counter are set to zero. In Step 404, the access point 12 broadcasts the start of a new cycle. In a preferred embodiment, the access point 12 sets a dedicated bit in the overhead of the message sent to the users to indicate the start of the cycle. But it will be readily apparent to one of ordinary skill in the art that there are any number of ways for the access point 12 to notify the users that a new cycle has started.

At the start of the cycle, the access point 12 broadcasts an initial back-off window to the wireless devices 14 (Step 406) and waits for a reservation slot (Step 408). When a reservation slot arrives, the reservation slot counter is incremented by one (Step 410) and a determination is made whether a collision occurred in the reservation slot (Step 412). If a collision occurred, then the collision counter is incremented by one (Step 414). If there was no collision, then a determination is made whether a successful reservation arrived in the reservation slot (Step 416). If a reservation was successful, the successful reservation counter is incremented by one (Step 418).

Next the algorithm determines whether additional reservation slots are arriving, that is, whether the reservation slot counter is equal to the back-off window (Step 420). If the reservation slot counter is not equal to the back-off window, the algorithm returns to Step 408 to await the next reservation slot. If the last reservation slot has arrived, then the system proceeds to Step 422.

In Step 422, the algorithm determines whether every user has successfully made a reservation. If no collisions occurred (collision counter equals zero) the current cycle has completed and the back-off window for the next cycle is set to equal the number of successful reservations that occurred in the current cycle (Step 424). Alternatively, if the algorithm determines in Step 422 that the current cycle has not completed (collision counter is greater than zero), then the collision counter is reset to zero (Step 426), a new back-off window is calculated (Step 428), and the algorithm returns to Step 406 where the new back-off window is broadcast to the users.

The following paragraphs explain how the new back-off window is calculated in Step 428. The number of collisions that occurred in the prior back-off window determines the size of the new back-off window. Specifically, the new back-off window is calculated using the following formula:

$$\text{i } W = \text{Ceil}(N_c * 2.3922),$$

where W is the size of the new back-off window, $N_c$ is the number of collisions that occurred since the last back-off window was broadcast, and Ceil(x) is the smallest integer which is equal to or greater than x.

In this formula, the value 2.3922 represents the number of users that are, on average, involved in a collision when the number of users on a system approaches infinity. As previously described in Section II, the maximum throughput of a system approaches $1/e = 0.3679$ as the number of users approaches infinity. Under these conditions, when maximum throughput is reached, idle slots occur with a probability of $1/e$ and collisions occur with a probability of $1 - 2/e = 0.2642$. And the average number of users involved in a collision equals (1-throughput)/(probability of collision)=2.3922.

FIG. 11 is a flow diagram that illustrates an embodiment of NOF in accordance with the present invention from the point of view of one of the plurality of wireless devices 14. In Step 500, a wireless device 14 with a data packet 22 in its transmission queue 20 waits for a new cycle to begin. To guarantee that every wireless device 14 will successfully transmit within a given cycle, a wireless device 14 that did not have a data packet 22 in its transmission queue 20 at the start of the cycle may not attempt to reserve a reservation slot until the start of the following cycle.

Once a new cycle begins, the wireless device 14 receives an initial back-off window (Step 502). As explained above, the size of the initial back-off window is equal to the number of successful reservations that occurred in the prior cycle and serves as an estimate of the number of users currently competing for system resources. In Step 504, the wireless device 14 randomly selects a number (k) between one and the size of the back-off window. For example, if the size of the back-off window is two, the number randomly selected will be one or two. The random number identifies which of the upcoming reservation slots the wireless device 14 will use when attempting to reserve a reservation slot.

In Step 506, the wireless device 14 waits for the reservation slot that corresponds to the randomly selected number (k). When the randomly selected reservation slot arrives, the wireless device 14 attempts to make a reservation in the reservation slot (Step 508). The reservation succeeds if the wireless device 14 is the only device to attempt a reservation in the particular reservation slot. The reservation fails, however, and collision occurs, if two or more wireless devices 14 attempt a reservation in the same reservation slot. If the reservation is successful (Step 510), the wireless device 14 is allocated bandwidth for data transmission and the wireless device 14 transmits the data (Step 512). If NOF determines in Step 510 that the reservation attempt of Step 508 failed, the wireless device 14 proceeds to Step 514 and waits for the next back-off window. The process continues until the wireless device 14 makes a successful reservation and transmits the data in its transmission queue 20.

The apparatuses and methods according to the present invention provide a back-off algorithm that is superior in many ways to the other back-off algorithms known in the art. Unlike tree and p-persistence algorithms, NOF does not require that the network have full knowledge of the three possible statuses (idle, collision, success) for every channel in the network. As a result, NOF can be implemented with relative ease and little expense and is available for implementation on networks that do not provide the feedback required by the tree and p-persistence algorithms.

As shown in Section II, FCR has much better throughput performance than the data contention algorithms known in the art. The following paragraphs show that NOF similarly outperforms the contention resolution methods known in the art.

FIG. 12 compares the average packet delay of an embodiment of NOF in accordance with the present invention and BEB. Arrival time, as used herein, measures how often active users attempt reservations. A low arrival time means that active users are aggressively seeking channel resources and, as a result, few reservation slots pass without a reservation attempt. In contrast, a higher arrival time means that active users are not attempting reservations as often and a relatively larger number of reservation slots pass between reservation attempts.

FIG. 12 shows that NOF has a smaller average packet delay under most traffic patterns and system loads. The single exception occurs when there are few active users on the system and the few users that are active are aggressively acquiring bandwidth (mean arrival time=2 slots). This parallels the findings discussed above in regards to the FCR algorithm. Under these limited conditions, BEB appears to have a lower average packet delay than NOF. But the successful transmissions that are occurring in BEB are dominated by the capture effect. A few users are able to transmit with little collision, while others are experiencing delays caused by increasing back-off window sizes.

FIG. 13 shows the differences in standard deviation of delay between an embodiment of NOF in accordance with the present invention and BEB. Standard deviation of delay determines how equitable the system is sharing the channel bandwidth between active users. A small standard deviation of delay implies that packets wait approximately the same amount of time before being transmitted successfully and, therefore, bandwidth is shared among competing users in a fairer way. A large standard deviation of delay, on the other hand, implies that bandwidth is not being shared by competing users equally. Thus, when capture effect is present, a large standard deviation of delay occurs since some of the packets transmit with a small probability of collision, while other packets have increasing larger back-off windows and a lower probability of successful transmission.

As discussed above in reference to FIG. 12, simulations showed that NOF has a lower average packet delay than BEB under almost all system conditions. The single exception occurs when there are a small number of active users that are aggressively competing for bandwidth. FIG. 13 reveals the reason for BEB's lower average packet delay under these limited conditions. When there are few users aggressively competing for bandwidth, BEB has a very large standard deviation of delay. This means that the lower average packet delay in these limited conditions is the result of capture effect. The figure shows that under these same conditions, NOF has a much lower standard deviation of delay than BEB and, therefore, does not experience capture effect. FIG. 13 further shows that FCR continues to have a lower standard deviation of delay as the number of active users increases and therefore, FCR consistently shares the system resources in a significantly fairer way.

FIG. 14 compares throughput for an embodiment of NOF in accordance with the present invention and BEB. This figure shows that capture effect causes BEB to have a higher throughput in the limited condition where there are few active users aggressively acquiring bandwidth. In all the other cases, NOF has a higher throughput than BEB, or there is negligible difference.

FIGS. 15–17 compare an embodiment of NOF in accordance with the present invention to an optimal system for each of the three measures of performance: average packet delay, standard deviation of delay and throughput. An optimal system, as that term is used herein, is a system that has perfect knowledge of the number of competing users in the system at the moment the access point broadcasts the back-off window. Because most real-world networks have no idea how many users are competing for resources at a given time, FCR and NOF use operational characteristics of the network to estimate the number of competing users and adjust the size of the back-off window accordingly. As can be seen in the figures, for each performance standard NOF performs quite closely to an optimal system.

In concluding the detailed description of the NOF algorithm, it should be noted that it would be obvious to those skilled in the art that many variations and modifications can be made to the preferred embodiment without substantially departing from the principles of the present invention. These variations and modifications are intended to be included herein within the scope of the present invention as set forth in the appended claims. Further, in the claims hereafter, the structures, materials, acts, and equivalents of all means or step-plus function elements are intended to include any structure, materials or acts for performing their cited functions.

That which is claimed:

1. A method for resolving data collision in a network shared by a plurality of users, the method comprising:
   calculating a first back-off window based at least in part on an estimate of a number of users on the network;
   sending the first back-off window to a plurality of users of the network;
   calculating a second back-off window based at least in part on a smallest integer equal to or greater than a number, which number results from a product of a number of collisions that occurred within the first back-off window and an average of a number of users in the network involved in a collision; and sending the second back-off window to one or more of the plurality of users of the network.

2. The method of claim 1, further comprising calculating subsequent back-off windows based at least in part on the number of collisions that occurred within a prior back-off window and sending the subsequent back-off windows to one or more of the plurality of users of the network.

3. The method of claim 1, further comprising initiating a cycle with a number of users that can compete for network resources during the cycle.

4. The method of claim 3, wherein calculating the second back-off window comprises calculating the second back-off window in the same cycle as the step of calculating the first back-off window.

5. The method of claim 3, further comprising ending the cycle when there are no collisions within a back-off window.

6. The method of claim 3, further comprising initiating a second cycle subsequent to the first cycle with a number of users that can compete for network resources during the second cycle.

7. The method of claim 3, wherein initiating a cycle comprises initiating a cycle based on a number of users that successfully reserved network resources during a prior cycle.

8. The method of claim 1, wherein the step of calculating the second back-off window based at least in part on the number of collisions that occurred within the first back-off window comprises calculating the second back-off window based on the product of the number of collisions that occurred within the first back-off window and a value for the average of number of users in the network involved in a collision of approximately 2.3922.

9. A method for resolving data collision in a network shared by a plurality of users, the method comprising:
sending a first back-off window to a plurality of users of the network;
calculating a second back-off window based at least in part on a smallest integer equal to or greater than a number, which number results from product of the number of users that collided while attempting to reserve network resources during the first back-off window and an average of number of users in the network involved in a collision;
sending the second back-off window to one or more of the plurality of users of the network; and
limiting network reservation attempts in the second back-off window to users that collided while attempting to reserve network resources during the first back-off window.

10. The method of claim 9, further comprising calculating subsequent back-off windows based on a number of users that collided in a prior back-off window and sending the subsequent back-off windows to one or more of the plurality of users of the network.

11. The method of claim 10, further comprising limiting network reservation attempts in the subsequent back-off windows to the users that collided while attempting to reserve network resources during a prior back-off window.

12. The method of claim 9, further comprising initiating a first cycle with a number of users that can compete for network resources during the cycle.

13. The method of claim 12, further comprising initiating a second cycle when no collisions occurred during a back-off window in the first cycle.

14. The method of claim 9, wherein the step of calculating the second back-off window based at least in part on the number of users that collided while attempting to reserve network resources during the first back-off window comprises calculating the second back-off window based on a product of the number of collisions that occurred within the first back-off window and a value for the average of number of users in the network involved in a collision of approximately 2.3922.

15. A system for resolving data collisions in a shared network, comprising:
a plurality of remote devices; and an access point in communication with the plurality of remote devices, wherein the access point further comprises:
a switch for communicating with the plurality of remote devices;
a transceiver for sending information to and receiving information from the plurality of remote devices; and a collision resolution device communicably coupled to the transceiver and the switch, wherein the collision resolution device sends an initial back-off window to the plurality of remote devices;
wherein the collision resolution device calculates and sends a subsequent back-off window based at least in part on a smallest integer equal to or greater than a number, which number results from a product of a number of collisions that occurred within the within the first back-off window and an average number of users in the network involved in a collision; and
wherein the collision resolution device limits the remote devices that can compete for network resources in the subsequent back-off window to remote devices that unsuccessfully attempted to reserve network resources in the initial back-off window.

16. The system of claim 15, wherein the size of the initial back-off window is based on an estimate of remote devices competing for network resources.

17. The system of claim 15, wherein the subsequent back-off window is calculated based at least in part on a product of the number of collisions that occurred within the initial back-off window and a value of 2.3922.

* * * * *